United States Patent [19]
Allan

[11] 3,800,013
[45] Mar. 26, 1974

[54] CHEMICAL EMBOSSING USING AMINE-FORMALDEHYDE DERIVATIVES

[75] Inventor: John L. H. Allan, Easton, Pa.

[73] Assignee: GAF Corporation, New York, N.Y.

[22] Filed: Apr. 16, 1971

[21] Appl. No.: 134,872

[52] U.S. Cl............... 264/52, 117/10, 161/116, 161/160, 264/45, 264/54
[51] Int. Cl............................................ B29d 27/00
[58] Field of Search ......... 260/2.5 HB, 2.5 P, 2.5 F; 264/45, 51, 54, 47, DIG. 82; 117/10, 72, 62.1

[56] References Cited
UNITED STATES PATENTS

| | | | |
|---|---|---|---|
| 3,453,171 | 7/1969 | Crowley | 260/2.5 HB X |
| 3,365,353 | 1/1968 | Witman | 264/45 |
| 3,478,096 | 11/1969 | Cyba | 260/2.5 P X |
| 3,402,133 | 9/1968 | Kühlkamp | 260/2.5 F |
| 3,522,196 | 7/1970 | Dorier | 260/2.5 F |
| 2,946,095 | 7/1960 | Beer | 260/2.5 P |
| 3,519,527 | 7/1970 | Crowley | 264/47 X |
| 3,282,865 | 11/1966 | Spencer | 260/2.5 F |
| 3,607,357 | 9/1971 | Findlay | 117/10 X |
| 3,671,283 | 6/1972 | Crowley | 117/9 |

Primary Examiner—Donald E. Czaja
Assistant Examiner—H. S. Cockeram
Attorney, Agent, or Firm—W. C. Kehm; S. B. Leavitt

[57] ABSTRACT

An improved process for the chemical embossing of a thermoplastic sheet comprising blending
1. a vinyl resin, e.g., polyvinylchloride,
2. a plasticizer for the vinyl resin,
3. a blowing agent which decomposes when heated at a temperature in the range above the glass transition temperature of the plasticized vinyl resin and below the decomposition temperature of the resin,
4. an amine-formaldehyde derivative that will undergo condensation polymerization under acidic conditions; and optionally,
5. a component containing a plurality of groupings which will undergo condensation polymerization with the derivative of (4) under acidic conditions.

Such a blended composition is formed into a sheet and to such sheet is applied, in a pre-determined pattern, a composition comprising
  a. a material that will penetrate the sheet and cause condensation polymerization of component (4) or components (4) and (5), and, optionally,
  b. a liquid that will penetrate the sheet, The foaming of the sheet and creating of the embossed effect is accomplished by causing the condensation polymerization to take place and heating the resulting sheet to a temperature sufficient to fuse the plasticized resin and decompose the blowing agent.

40 Claims, No Drawings

CHEMICAL EMBOSSING USING AMINE-FORMALDEHYDE DERIVATIVES

The present invention is directed to a process of producing an embossed effect on a foam decorative material, e.g. a decorative surface covering; more particularly, the present invention is directed to a process of producing such embossed effect chemically without the use of mechanical embossing.

The mechanical embossing of foamed or cellular sheets, in combination with printing, has always presented several problems. It has been difficult to achieve sharp edges and sharp lines of demarcation in the embossed areas when dealing with foamed structures. Where printing is carried out in addition to the embossing, the problem of attaining register between the embossing rolls and the printing rolls has been exceedingly difficult. The difficulty increases with the width of the embossed and printed sheet. Therefore, there has been a need for an improved method of imparting an embossed appearance to the thermoplastic sheet.

To eliminate these deficiencies and disadvantages of conventional mechanical embossing of foamed or cellular sheets in combination with printing, various methods of chemical embossing have been developed. All of these methods generally involve the selective retardation or promotion of the foaming of a plastisol or organosol composition so that the resultant product will have both unfoamed and foamed regions.

Some previous methods of chemical embossing which have been developed have involved the utilization of a polyethylenically unsaturated monomer or mixture of the same with a monoethylenically unsaturated monomer which will polymerize and cross-link with the vinyl resin thereby producing areas in which foaming is retarded. While such systems have been fairly satisfactory, it has been discovered in accordance with the present invention that exceptional embossed effects can be provided by including within a thermoplastic composition containing a vinyl resin, plasticizer and blowing agent an amine-formaldehyde derivative which will undergo condensation polymerization reactions under acidic conditions. The chemical embossed effect is produced in accordance with the present invention by applying in a predetermined pattern a component which will effect the condensation polymerization of the amine-formaldehyde derivative at ambient temperatures under acidic conditions or at elevated temperatures below the decomposition temperature of the vinyl resin. Optionally, the thermoplastic blend contains an additional component containing a plurality of groupings which will undergo condensation polymerization reactions with the amine-formaldehyde derivatives under acidic conditions. Thus, in accordance with the present invention, it has been discovered that a satisfactory embossed effect can be produced in accordance with the process of the present invention in an extremely economical and practical manner.

Accordingly, it is a principal object of the present invention to provide a process for the production of chemically embossed foamed decorative sheets, particularly foamed decorative surface coverings in a manner not contemplated by the prior art while eliminating the inherent deficiencies thereof.

It is a further object of the present invention to provide an improved process of the chemical embossing of thermoplastic sheets, by which a foamed decorative effect is produced through the employment within a thermo-plastic composition of an amine-formaldehyde derivative which is capable of undergoing condensation polymerization reactions under acidic conditions.

Yet a further object of the present invention relates to such an improved process for the chemical embossing of thermoplastic sheets wherein in addition to such an amine-formaldehyde derivative the thermo-plastic blend contains a component containing a plurality of groupings which will undergo condensation polymerization reactions with the amine-formaldehyde derivative under acidic conditions.

Yet a further object of the present invention relates to a process for the production of a chemical embossed effect by blending and forming a sheet of thermoplastic material comprising a vinyl resin, a plasticizer therefor, a blowing agent which decomposes when heated at a temperature in the range above the glass transition temperature of the plasticized vinyl resin and below the decomposition temperature thereof, an amine-formaldehyde derivative which will undergo condensation polymerization reactions under acidic conditions and optionally a component containing a plurality of groupings which will undergo condensation polymerization reactions with the amine-formaldehyde derivative under acidic conditions and applying to such sheet in a predetermined pattern a composition containing a component which will bring about the condensation polymerization of the amine-formaldehyde derivative and optional component at ambient temperatures or a temperature below the decomposition temperature of the vinyl resin.

Still further objects and advantages of the novel process of the present invention will become more apparent from the following more detailed description thereof.

The above objects and advantages of the novel process of the present invention are achieved through an improvement associated with the chemical embossing of foamed decorative sheet materials and foamed decorative surface covering materials in particular.

Thus, it has been found in accordance with the present invention that a great economic and industrial improvement over conventionally employed chemical embossing processes can be achieved by conducting a process for the chemical embossing of foamed decorative sheet materials using in addition to a polyvinyl resin plasticizer therefor and blowing agent, an amine-formaldehyde derivative which is capable of undergoing condensation polymerization reactions under acidic conditions. Thus through the employment of such amine-formaldehyde derivative the process of the present invention comprises an improvement in the chemical embossing of thermoplastic sheet material, particularly, sheet material comprising polymers and copolymers of vinyl chloride.

In this regard, the improvement of the present invention resides in the use of such an amine-formaldehyde derivative and optionally a component containing a plurality of groupings which will undergo condensation polymerization reactions with the amineformaldehyde derivative under acidic conditions, the chemical embossed effect being obtained by applying to the thermoplastic sheet in a predetermined pattern, a composition containing a component which will bring about the condensation polymerization reactions at ambient temperatures or at a temperature below the decomposition temperature of the vinyl resin. As will be described herein below, such a component which will bring about the condensation polymerization reactions when applied to the thermoplastic sheet in a predetermined pattern is generally:

a. a strong acid,
b. a compound which will generate a strong acid upon reaction with hydroxylic or amino groupings at ambient or elevated temperatures, or
c. a compound which will generate a strong acid on heating to elevated temperatures.

Accordingly, by effecting the condensation polymerization reactions preferentially over selected areas of a thermoplastic sheet it is possible to produce crosslinking and three dimensional network formation in such areas and thus preferentially retard foaming therein. In this regard, such a process therefore allows for the production of an effective chemical embossed effect.

Generally, the process of the present invention directed to the production of embossed appearance on a thermoplastic sheet comprises blending:

1. a vinyl resin, e.g. polyvinylchloride,
2. a plasticizer for the vinyl resin,
3. a blowing agent which decomposes when heated at a temperature in the range above the glass transition temperature of the plasticized vinyl resin and below the decomposition temperature of the resin,
4. an amine-formaldehyde derivative which is capable of undergoing condensation polymerization reactions under acidic conditions and optionally,
5. a component containing a plurality of groupings which will undergo condensation polymerization reactions with the amine-formaldehyde derivative of (4) under acidic conditions.

Such a composition or blend is formed into a sheet and applied to such sheet in a predetermined pattern is a composition comprising:

a. a component which will bring about the condensation polymerization reactions of components (4) or components (4) and (5) at ambient temperatures or at a temperature below the decomposition temperature of the vinyl resin, i.e., a strong acid, a compound which will generate a strong acid upon reaction with hydroxylic or amino groupings at ambient or elevated temperatures, or a compound which will generate a strong acid on heating to elevated temperatures, and optionally
b. a liquid that will penetrate the sheet.

As indicated from the above, the component applied in a predetermined pattern to the thermoplastic sheet is one which can initiate the condensation polymerization reactions at ambient temperatures or elevated temperatures. When such reaction is initiated at ambient temperatures, of course, the same takes place immediately upon application of such component and the effect of crosslinking is manifested on subsequent decomposition of the blowing agent and foaming of the thermoplastic sheet. Where the effect of the component is achieved at elevated temperatures, the initiation of the condensation polymerization reactions can occur upon heating simultaneously with the fusion of the plasticized resin and decomposition of the blowing agent.

In either event, it is necessary to heat the sheet of thermoplastic material to which the initiating component has been applied in a predetermined pattern to an elevated temperature sufficient to fuse the plasticized resin, decompose the blowing agent, and initiate the condensation polymerization reactions if necessary. By such a process the portion of the sheet to which the initiating component has been applied will remain substantially unfoamed due to the restricting character of the crosslinked effect produced by the condensation polymerization reactions while the portions to which such initiating component has not been applied will be fully foamed. This, of course, will result in producing a patterned embossed effect containing high areas, i.e., fully foamed areas, and valleys, i.e., areas in which foaming has been restrained.

It is noted that as employed hereinbefore, and as employed throughout the remainder of the specification and dependent claims the expression "condensation polymerization reactions" is meant to embrace those reactions which are defined as condensation reactions and result in the formation of cross-linked or space-network structures as defined by P. W. Morgan in "Condensation Polymers: By Interfacial and Solution Methods" (John Wiley & Sons, New York, 1965, Pages 465 – 467).

It is pointed out that, in addition to the procedure briefly described above, alternatively, in accordance with the process of the present invention the initiating component, i.e., that component which will bring about the condensation polymerization reactions of the amine-formaldehyde derivative and optional component under ambient or elevated temperatures and optional penetrated liquid may be applied to a supporting sheet with the vinyl resin blend being applied to the supporting sheet above such composition. Again, whether the initiation of the condensation polymerization reaction occurs at ambient temperatures or elevated temperatures, heating such a material to a temperature sufficient to fuse the blend and decompose the blowing agent will effect the same chemical embossing appearance of the vinyl sheet product as previously described, i.e., will produce a product having both completely foamed and unfoamed areas.

In accordance with the present invention, any thermoplastic resin can be employed which is capable of being formed into films or sheets. Such resins preferably comprise vinyl resins; and more preferably, polymers and copolymers of vinylchloride. Thus, while polyvinylchloride itself is the preferred vinyl resin employed in accordance with the process of the present invention, copolymers of vinyl chloride with comonomers such as vinyl acetate, vinylidene chloride, other vinyl esters such as vinyl propionate, vinyl butyrate, as well as alkyl-substituted vinyl esters, may be advantageously utilized.

In addition, vinyl chloride may be copolymerized with a variety of other monomeric materials, including arcylic compounds such as, for example, acrylic acid, methacrylic acid, and the alkyl esters thereof. When unusually excellent properties of abrasion resistance, toughness, and tensile strength are not required, as may well be the case with a wall covering or other merely decorative application, othe materials may be used as a thermoplastic resin. Examples of such materials will be polystyrene, substituted polystyrene, polyethylene, polypropylene, acrylic acid, alkyl acrylic esters, alkyl methacrylic esters, and the like. The thermoplastic resins are those formed by addition polymerization as opposed to the normally non-thermoplastic resins usually formed by condensation. The glass transition temperature of these resins is the temperature at which the resin changes from a hard, brittle solid to a flexible solid. Increasing plasticization of the resin increasingly lowers the glass transition temperature. As a practical matter, the glass transition temperature of the resin lies close to the initial gellation temperature of the resin dispersed in a plasticizer even though the initial gellation temperature is rate sensitive.

In producing the thermoplastic resin blend utilized in accordance with the process of the present invention, the thermoplastic resin as described above will be combined with a suitable plasticizer. Thus, for example, in accordance with the present invention, suitable plasticizers include the conventionally employed ester-type plasticizers, including, for example, dioctyl phthalate, dioctyl sebacate, dioctyl adipate, dioctyl azelate, among others, in which the octyl group is frequently in the form of a 2-ethyl hexyl group. Other suitable plasticizers suitably employed in the plasticization of thermoplastic resins and polyvinylchloride in particular include, for example, dibutyl phthalate, dibutyl sebacate, dibutyl adipate, and the like. Tricresyl phosphate and other suitable phosphate ester plasticizers can also be employed in accordance with the process of the present invention. Generally, the plasticizer is blended with the thermoplastic resin in a range of from 20 to 130 parts by weight of the plasticizer per 100 parts by weight of the resin. Of course, greater or lesser amounts of the plasticizer can be employed, the amount of plasticizer generally being controlled by the selection of the particular plasticizer, the particular resin, and the utility of the final product.

In accordance with the process of the present invention, a blowing agent is incorporated in the blend of the vinyl resin. The blowing agent, comprising the third essential component of the resin blend, is one which decomposes when heated at a temperature within the range of above the glass transition temperature of the plasticized vinyl resin and below the decomposition temperature of the resin. Such blowing agent employed herein may comprise one or a mixture of blowing compounds alone or, as in known systems, with kickers (accelerators, catalysts), and/or inhibitors therefor, and in accordance with the process of the present invention should be uniformly distributed throughout the resin-plasticizer blend. A number of blowing agents particularly applicable for the blowing or foaming of vinyl resins and polyvinylchloride in particular are commercially available, the most widely used of these being azo-bis formamide. Such material normally decomposes at a temperature of about 390°F. in air. Because of this relatively high decomposition temperature, such a blowing agent is particularly adapted for use in the process of the present invention and thus is preferred. Other conventional blowing agents, however, can be suitably employed in accordance with the improved process of the present invention. Such conventional blowing agents and the temperature at which they release gas vigorously in dioctyl phthalate are represented in the following table:

| Blowing Agent: | Temperature, °F. |
| --- | --- |
| Azobisisobutyronitrile | 240 |
| N,N'-dimethyl-N,N'-dinitrosoterephthalamide | 220 |
| p,p'-Oxybis (benzenesulfonylhydrazide) | 320 |
| p,p'-Oxybis (benzenesulfonylsemicarbazide) | 425 |
| Barium azodicarboxylate | 480 |
| Dinitrosopentamethylenetetramine (80%) | 370 |

Thus, as noted from the above, the conventional blowing agents useful in the blowing or foaming of vinyl resins and polyvinylchloride in particular generally fall within the general class of substituted hydrazides, substituted azo compounds, and substituted nitroso compounds. In this regard, any of the conventionally employed blowing agents useful in the foaming of vinyl resins can be employed in accordance with the process of the present invention, the above noted particular foaming agents only being representative of those which are useful. Thus, it is only necessary that the blowing agent employed in accordance with the process of the present invention be one which decomposes when heated at a temperature in the range of above the glass transition temperature of the plasticized vinyl resin and below the decomposition temperature of the vinyl resin.

As a general rule, the preferred minimum decomposition temperature of the blowing agent should be about 300°F., the decomposition temperature of polyvinylchloride being, for example, about 400°F. Accordingly, the blowing agent should be one which decomposes within such temperature range, or, more practically, within the temperature range of 300°F. to 450°F., the temperature at which a stabilized vinyl resin composition will normally decompose.

While the amount of blowing agent employed in accordance with the process of the present invention is not critical and the same need only be employed in an amount so that effective foaming can be achieved when the blowing is thoroughly distributed throughout the resin-plasticizer mixture, the blowing agent will normally be present in an amount within the range of 0.5 to 15 percent by weight, based on the weight of the thermoplastic resin. Of course, slightly higher or lower amounts of blowing agent can be advantageously utilized where desired for particular purposes.

As indicated previously, in accordance with the improved process of the present invention, the vinyl resin-plasticizer blend has incorporated therewith an amine-formaldehyde derivative which is capable of undergoing condensation polymerization reactions under acidic conditions. Such a derivative as employed in accordance with the present invention undergoes condensation polymerization under the conditions to be hereinafter described and forms cross linkages with the polyvinyl resin chains. Accordingly, such condensation polymerization and cross linking effect is what allows for the retardation of the foaming of the vinyl resin sheet in those areas in which the sheet has been coated with the component capable of bringing about the condensation polymerization reactions of the amine-formaldehyde derivative.

The amine-formaldehyde derivatives which can be advantageously employed in accordance with the present invention are materials which are not readily miscible with the vinyl resin system and, as indicated previously, are capable of undergoing condensation polymerizations reactions under acidic conditions. Thus for example such amine-formaldehyde derivatives can be the monomeric or partially polymerized derivativatives obtained by reacting a molar equivalent of an amine, for example, urea, ethylene urea, uron, thiourea, melamine, benzoguanamine, acetoguanamine, etc., with at least two molar equivalents of formaldehyde in alkaline, neutral, or acidic environments e.g., aqueuous or non-aqueous media. Accordingly, as seen from the above the amine of the amine-formaldehyde derivatives can comprise any of the conventionally utilized urea, triazine, and guanamine derivatives.

Preferably in accordance with the present invention the amine-formaldehyde derivatives are further modified by etherification with alcohols, glycols and glycol ethers. Thus for example suitable alcohols capable of etherification of the amine-formaldehyde derivatives include the aliphatic alcohols having from one to about 22 carbon atoms. Such alcohols include among others methanol, ethanol, butanol, n-hexanol, n-octanol, isooctanol, dodecanol, stearyl alcohol, etc. Similarly suitable glycols include such as ethylene glycol, propylene glycol and similar lower alkylene glycols. Similarly ethylene glycol monoalkyl ethers such as ethylene glycol monomethyl ether, ethylene glycol monoethyl ether, ethylene glycol monobutyl ether, etc., i.e., ethylene glycol mono lower alkyl ethers can be advantageously utilized. Such amine-formaldehyde derivatives and the etherification products thereof are well known products generally referred to as aminoplasts.

In addition to the above recited amine-formaldehyde derivatives other derivatives may be advantageously employed in accordance with the process of the present invention. Thus for example, amine-formaldehyde derivatives may be prepared from the reaction of formaldehyde with acrylamide polymers and copolymers which derivatives may also be modified by etherification with the above described alcohols and similar materials. Similarly suitable amine-formaldehyde derivatives which can be employed in accordance with the process of the present invention may be prepared by the reaction of formaldehyde with N-hydroxymethyl or N-methoxymethyl acrylamide derivatives obtained by the prior etherification of acrylamide polymers.

All of the amine-formaldehyde derivatives suitable for use in the present invention, however they are made, are characterized by containing at least two N-hydroxymethyl or N-alkoxymethyl groupings taken singly or together. The preferred derivatives are those obtained from melamine which contain at least four molecules of formaldehyde per molecule of melamine, and which have been methylated and contain at least four methoxy groupings per molecule of melamine. Especially useful are the hexamethoxymethyl melamine compounds available commercially under the trade names of "Cymel 300" and "Cymel 301."

In accordance with the present invention the amount of the amine-formaldehyde derivative used will depend on a variety of factors including, its reactivity, its functionality, its viscosity or degree of precondensation polymerization, its compatibility with the other components of the thermoplastic sheet both before and after fusing and upon the type and the amount of optional copolymerizable component utilized. In general however the amount of amine-formaldehyde derivative employed in accordance with the process of the present invention will vary between about 2 percent and about 30 percent by weight based upon the total weight of the thermoplastic sheet.

In addition to the amine-formaldehyde derivative employed in accordance with the process of the present invention the thermoplastic blend may optionally contain a component which contains a plurality of groupings which will undergo condensation polymerization reactions with the amine-formaldehyde derivative under acidic conditions. A wide variety of such components can be advantageously employed in accordance with the process of the present invention, the groupings which can undergo condensation polymerization reactions with the amine-formaldehyde derivative generally being primary hydroxyl, secondary hydroxyl, primary amino, secondary amino, carboxylic acid or anhydride, amide, carbamido, or imido groups. Accordingly the components which can be optionally employed in accordance with the present invention are those which contain a plurality of such groupings i.e., two or more of the same groupings or a combination of such groupings wherein at least two of the groupings are present in the optional component. In addition, a mixture of such components containing two or more groupings capable of undergoing condensation polymerization reactions with the amine-formaldehyde derivative employed in accordance with the process of the present invention can be advantageously utilized. It is additionally pointed out that the components having a plurality of groupings as specified above can be both monomeric and polymeric materials capable of undergoing condensation polymerization with the amine-formaldehyde derivative. In this connection suitable components containing a plurality of hydroxyl groups or one or more hydroxyl groups in conjunction with one or more of the above defined groupings include such as: ethylene glycol; butylene glycol; neopentyl glycol; glycerol; 1,2,6-hexane triol; trimethylol propane; castor oil; diethylene glycol; polyols prepared by the reaction of alkylene oxides, such as propylene oxide, with compounds such as glycerol or sorbitol which contain at least two active hydrogen atoms; hydroxyl-ended polyesters; polymers or copolymers of $\beta$-hydroethyl methacrylate or acrylate; $\beta$-hydroxyethyl cellulose; polyvinyl alcohol or hydrolyzed polyvinylacetate polymers or copolymers; etc.

Similarly materials containing a plurality of acid or acid anhydride groupings include the diabasic organic carboxylic acids and polymerizable derivatives thereof. Thus for example suitable components include: succinic acid; adipic acid; maleic acid; phthalic acid; anhydrides of suitable dicarboxylic acids; polymers or copolymers of methacrylic acid, acrylic acid, maleic acid, itaconic acid, etc.

Additionally suitable components containing amido or imino groupings include such as: amides or imino derivatives of the above carboxylic acids, such as maleimide, or polymers and copolymers of methacrylamide; urea; acetoguanamide; etc.

Lastly, suitable compounds containing a plurality of amine groups include the alkylene and polyalkylene diamines and alkanolamines derivatives. Thus representative components falling within this group includes such as: ethylene diamine; diethylene triamine; polyethylene diamine; ethanolamine; diethanolamine; triethanolamine, etc.

As indicated above such components containing a plurality of groupings capable of undergoing condensation polymerization reactions with the amine-formaldehyde derivative in accordance with the present invention are only optionally employed in the thermoplastic composition. Accordingly, such optional components can be present in such composition in an amount varying from 0 to about 60 percent by weight based on the total weight of the thermoplastic sheet. Preferably such optional component is employed in an amount of from about 5 percent by weight to about 25 percent by weight based on the total weight of the sheet. The optimum usage of such optional components will depend of course on the type of amine-formaldehyde derivative used and whether the optional component can be employed as a partial substitute for the plasticizer for the vinyl resin or as a partial substitute for the vinyl resin itself.

To these ingredients, the resin, the plasticizer, the blowing agent, and the amine-formaldehyde derivative plus optional component, there may be added additional ingredients such as pigments, dyes, or other decorative elements to the composition to be formed into one sheet. Depending on the material used and the intensity of the color desired, the amounts of such extra additives will normally range from a small fraction of a percent to 20 percent by weight of the total composition. Relatively small amounts of a granular filler such as a clay, a limestone, or a silicate may be used. However, the composition will not be highly filled in view of a need for at least a portion of the composition to expand and form a cellular or foamed region. Fillers to be used, if any, will normally be present in less than about 20 percent by weight of the total composition. Small amounts of heat and light stabilizers will also be incorporated. These are known in the art and may comprise the barium-cadmium salts of long-chain fatty acids, polyols such as pentaerythritol or alphamethylglucoside, nitrogen compounds such as melamine or dicyandiamide, esters such as phenyl phthalate, phenyl benzoate, o-toluol benzoate, triethylene glycol salicylates, certain of the organic phosphates, and mixtures thereof. Such stabilizers will not normally be present in amounts greater than about 3 percent by weight of the total composition.

As indicated previously, in accordance with the process of the present invention, the above-defined components are blended and then formed into a sheet by any conventional method known in the art. Thus, for example, the plastisol composition may be doctored, roll coated, or otherwise applied to a strippable carrier sheet. Of course, such process of forming a thermoplastic sheet from the vinyl resin plastisol composition is the same as utilized in prior art processes involving similar chemical embossing techniques. The thermoplastic sheet produced in accordance with the process of the present invention will generally have a thickness within the range of about 0.01 to about 0.2 inches exclusive of any backing material. To this thermoplastic sheet is applied a printing ink in a pre-determined pattern, the printing ink containing a component capable of effecting the condensation polymerization reaction at ambient temperatures or an elevated temperature below the decomposition temperature of the vinyl resin. Optionally, the printing ink containing such components will contain a liquid that will penetrate the thermoplastic sheet. This, of course, allows better contact of the initiating component and the amine-formaldehyde derivative.

Such initiating component which is applied to the thermoplastic sheet in a predetermined pattern, and which is preferably a material that can penetrate the sheet is in accordance with the present invention preferably selected from, (a) a strong acid, (b) a compound which will generate a strong acid upon reaction with hydroxylic or amino groupings at ambient or elevated temperatures, or, (c) a compound which will generate a strong acid on heating to elevated temperatures. Included within this last group are compounds which are capable of liberating a substance, such as sulfur dioxide or sulfur trioxide for example, which may function by generating a strong acid when contacted with moisture or with the hydroxylic or amino groups of the components present in the sheet. Examples of such components which can be employed in accordance with the process of the present invention therefor include: benzene sulfonic acid; p-toluene sulfonic acid; m-benzenedisulfonic acid; p-chlorobenzoic acid; p-chlorocinnamic acid; p-fluorobenzoic acid; 2,4 dichlorobenzoic acid; 2-chloro-4-nitrobenzoic acid; p-nitrobenzoic acid; 3,4-dimethoxy-benzoic acid; formic acid; trifluoroacetic acid; tribromoacetic acid; bis(p-chlorophenyl) acetic acid; propiolic acid; sulfuric acid; hydrochloric acid; mono- and di-alkyl or aryl esters of phosphoric acid; perchloric acid; hexafluorophosphoric acid; fluorsilicic acid; fluoboric acid; boron trifluoride etherate; trimethoxyboroxine; acetyl chloride; stearoyl chloride; oxalyl chloride; benzoyl chloride; trichloroacetyl chloride, p-toluenesulfonyl chloride; o-sulfobenzoic anhydride; mucochloric acid; 3-sulfolene; 2,4-dimethyl-3-sulfolene; cyclic sulfites of ethylene glycol, 1,3-butylene glycol, and neopentyl glycol; triethylaminesulfur trioxide complex; t-butyl esters of p-toluenesulfonic acid, p-nitrobenzenesulfonic acid; and p-chlorobenzenesulfonic acid; dimethyl sulfate, diethyl sulfate; methanesulfonic acid; trichloroacetic acid, and the like.

As indicated previously, such component applied in a predetermined pattern is capable of catalyzing or initiating the condensation polymerization of the amine-formaldehyde derivative and optional component at ambient temperatures, or on heating to a temperature below the decomposition temperature of the vinyl resin. Accordingly, such condensation polymerization of the amine-formaldehyde derivative and optional component will occur almost immediately with application and penetration of the above defined catalyst or initiator or subsequently upon heating of the thermoplastic sheet to a temperature below the decomposition temperature of the vinyl resin and below or above the decomposition temperature of the blowing agent.

As indicated previously, the ink composition which is applied in a pattern over selected areas of the thermoplastic sheet preferably contains a liquid capable of penetrating the thermoplastic sheet so as to carry the condensation polymerization catalyst or initiator into the thermoplastic sheet to more effectively promote the condensation polymerization of the system. Such a penetrating liquid generally comprises a carrier liquid, which is preferably a diluent, solvent, or plasticizer for the particlar vinyl resin of the thermoplastic sheet. Thus, for example, a mixture of methylethyl ketone and dioxane serves as a particularly suitable carrier for many of the polymerization catalysts. The carrier liquid or penetrating liquid that is chosen should be one which the condensation polymerization catalyst or initiator is soluble in or at least partly soluble, so that upon sufficient penetration of the liquid into the thermoplastic sheet the catalyst or initiator will be carried into the sheet for best contact of the catalyst with the condensation polymerizable components.

As indicated previously, the chemical embossed effect is obtained by distributing the catalyst or intiator, preferably in the penetrating liquid, over predetermined areas of the thermoplastic sheet, so that the preferential condensation polymerization of the system in those areas over which the catalyst composition or pinting ink has been applied will produce areas which are foamed to a lesser extent than those areas over which the catalyst composition was not applied.

Application of the carrier liquid containing the catalyst or initiator may be carried out in any convenient manner. The liquid may in fact be used as a printing ink and may also contain dyes, pigments, fillers, wetting agents, stabilizers, and other compounds normally found in ink. Such a colored ink, when printed on an above-described thermoplastic sheet by any of known printing methods, will produce a colored design or pattern printed on the sheet.

As indicated previously, as an alternative to applying a catalyst and optional penetrating liquid directly to the top surface of the thermoplastic sheet, the composition containing the catalyst and optional penetrating liquid may be applied to a supporting sheet with the blend of thermoplastic polymer being applied to the supporting sheet above the catalyst composition.

When the catalyst composition and optional penetrating liquid are applied to the thermoplastic sheet or supporting sheet the thickness of the application will generally range from about 0.1 mils to about 20 mils depending somewhat on the ability of the carrier liquid to penetrate the thermoplastic sheet and on the concentration of the catalyst in the liquid carrier. The amount of catalyst or initiator employed and the extent to which the catalyst is diluted with other materials, e.g., penetrating liquid, will normally depend, for example, on the effectiveness of the catalyst in bringing about the condensation polymerization reactions, the amount of the composition applied, and its method of application. In general, however, it has been found the minimum concentration of the catalyst in the composition to be effective when applied in selected areas is about 5 percent by weight. Generally, the catalyst will comprise from about 5 percent to about 50 percent by weight based on the total weight of the ink composition.

Where the surface covering prepared by the present process is to be used as a floor covering, an additional wearing surface may be applied over the entire system prior to the final heating step which will bring about the foaming and polymerization. Once the composition containing the catalyst has been applied in a decorative pattern on the surface of the thermoplastic sheet, the sheet may be dried without causing foaming by the application of a gentle heat.

A clear or colored coating of a thermoplastic resin may be then sprayed, doctored, or roll applied over the entire sheet in known manner. This final coating may contain a flatting agent to control gloss. Such coating may consist of a plastisol or organosol; it normally will have little pigment or filler therein. This clear coat will be the final coat and will overlay any printing which has previously been applied to the thermoplastic sheet. On the application of heat to cause fusion of the resin, decomposition of the blowing agent, and polymerization of the monomer, the clear coat will also fuse and become an integral part of the system covering both the raised foam areas and the low unfoamed areas on the sheet.

In addition to the description of the present invention as set forth above with respect to the production of floor covering, etc., by the chemical embossing of a thermoplastic sheet, it is, of course, obvious that the present invention can be utilized in connection with the production of floor covering and similar materials by laminating a clear, prefused vinyl sheet to an already embossed foam vinyl sheet product in accordance with the process of the present invention. Such methods of laminating are well known in the art and hereby incorporated by reference.

In addition to such other utilization of the process of the present invention, it should be additionally clear that a floor covering or similar article can be prepared by laminating a clear wear layer to a foamable layer prior to embossing in accordance with the present invention or application of a clear wear layer as a solution to a thermoplastic sheet after having been chemically embossed in the manner disclosed herein. All of these procedures are capable of producing decorative articles, particularly floor coverings, whlie taking advantage of the effective chemical embossing process of the present invention.

The improved process of the present invention will now be described by reference to the following specific examples.

EXAMPLE 1

A plastisol was prepared from the following ingredients:

| Blend A | Parts |
|---|---|
| Poly(vinyl chloride) | 135 |
| Hydrolyzed poly(vinyl chloride-co-vinyl acetate; containing 5.9% vinyl alcohol equiv.) | 45 |
| Plasticizer (dibutyl phthalate) | 80 |
| Hexakis(methoxymethyl)melamine | 20 |
| Metallic soap stabilizer | 4.5 |
| Titanium dioxide (1:1 in dioctyl phthalate) | 2.0 |
| Blowing agent (1:1 in dioctyl phthalate) | 9 |
| Hydrocarbon diluent | 7.5 |

Catalyst solutions containing pigment and binder were prepared from the following blends:

| Blend B | Parts |
|---|---|
| Pigment (2.5 parts with 1 part dioctyl phthalate) | 85 |
| Calcium carbonate | 25 |
| Vinyl chloride/vinyl acetate copolymer | 125 |
| Plasticizer (dibutyl phthalate) | 8 |
| Dispersing agents | 2.4 |
| Aromatic hydrocarbon | 133 |
| Dioxane | 477 |

| Blend C | Parts |
|---|---|
| Vinyl chloride/vinyl acetate copolymer | 50 |
| Dioxane | 338 |

| Blend D | Parts |
|---|---|
| Methyl Methacrylate/ethyl acrylate copolymer | 12 |
| Hydrocarbon diluent | 18 |
| Dioxane | 55 |

The above blends were mixed with the following catalysts in the parts given:

| No. | Catalyst | Parts Catalyst | Parts Blend B | Parts Blend C | Parts Blend D |
|---|---|---|---|---|---|
| i. | Benzenesulfonic acid | 7.7 | 77 | 15.3 | — |
| II) | do | 20 | 77 | 3 | — |
| iii. | do. | 15 | — | — | 85 |
| iv. | p-toluenesulfonic acid | 20 | 77 | 3 | — |
| v. | do | 15 | — | — | 85 |
| vi. | m-Benzenedisulfonic acid | 7.7 | 77 | 15.3 | — |
| vii. | do. | 15 | — | — | 85 |
| viii. | Methanesulfonic acid | 15 | — | — | 85 |
| ix. | Trichloroacetic acid | 10 | 75 | 15 | — |
| x. | Trichloroacetic acid | 20 | 77 | 3 | — |
| xi. | Mucochloric acid | 20 | 77 | 3 | — |
| xii. | Hydrochloric acid (36%) | 7.7 | 77 | 15.3 | — |
| xiii. | Sulfuric acid (98%) | 7.7 | 77 | 15.3 | — |
| xiv. | Phosphoric acid (85%) | 7.7 | 77 | 15.3 | — |
| xv. | do. | 20 | 77 | 3 | — |
| xvi. | 3-sulfolene | 7.7 | 77 | 15.3 | — |
| xvii. | do. | 20 | 77 | 3 | — |
| xviii. | do. | 15 | — | — | 85 |
| xix. | 3-Methyl-3-sulfolene | 20 | 77 | 3 | — |
| xx. | 2,4-Dimethyl-3-sulfolene | 20 | 77 | 3 | — |
| xxi. | Diethyl sulfate | 15 | — | — | 85 |

The plastisol (A) containing the vinyl chloride polymer was applied at a wet thickness of about 0.01 inch to a cardboard backing and gelled in an oven for 5 minutes at 120°C. The blends containing the catalysts, No.'s (i) through (xxi), were applied in strips of 0.0005 to 0.001 inch thickness to the gelled plastisol using a Bird Blade. The sheet was then fused and expanded in an oven held at 180°C. for 3.5 min. Each sheet had an embossed effect, the degree of which increased with increasing contentration of the particular acid used.

When the experiment was repeated, except that catalyst blends No.'s (iii), (v), (vii), (viii), (xviii), and (xxi) were applied as strips to the cardboard backing before the plastisol blend (A) was applied (instead of being printed on top of the gelled plastisol) an improved embossed effect was obtained.

Example 2

The experiment of Example 1 was repeated, using the catalyst blends No.'s (iii), (v), (xviii), and (xxi) with each of the following plastisol blends E and F.

| Component | Blend E (parts) | Blend F (Parts) |
|---|---|---|
| Poly(vinyl chloride) | 157.5 | 135 |
| Hydrolyzed poly(vinyl chloride-co-vinyl acetate; containing 5.9% vinyl alcohol equiv.) | 22.5 | 45 |
| Hexakis(methoxymethyl)melamine | 40 | 40 |
| Plasticizer (dibutyl phthalate) | 60 | 60 |
| Metallic soap stabilizer | 4.5 | 4.5 |
| Titanium dioxide (1:1 in dioctyl phthalate) | 20 | 20 |
| Blowing agent (1:1 in dioctyl phthalate) | 9 | 9 |
| Hydrocarbon diluent | 7.5 | 7.5 |

Compared with plastisol blend A, with the same catalyst blends of Example 1, blend E gave somewhat less embossing, and blend F gave slightly enhanced embossing.

EXAMPLE 3

The experiment of Example 1 was repeated, using the catalyst blends No.'s (ii), (iv), (x), (xi), (xv), (xvii), and (xix) with each of the following plastosol blends G and H.

| Component | Blend G (Parts) | Blend H (Parts) |
|---|---|---|
| Poly(vinyl chloride) | 135 | 135 |
| Methyl methacrylate/ethyl acrylate/ 2-hydroxyethyl methacrylate copolymer | 45 | 45 |
| Hexakis (methoxymethyl)melamine | 20 | — |
| Butylated melamine - formaldehyde resin | — | 20 |
| Metallic soap stabilizer | 4.5 | 4.5 |
| Titanium dioxide (1:1 in dioctyl phthalate) | 20 | 20 |
| Blowing agent (1:1 in dioctyl phthalate) 9 | 9 | |
| Hydrocarbon diluent | 7.5 | 14 |
| Plasticizer | 80 | 73.5 |
| n-Butanol | — | 6.5 |

A marked embossed effect was obtained with both blends G and H.

What is claimed is:

1. A process for providing an embossed appearance to a thermoplastic sheet comprising blending
   1. a vinyl resin
   2. a plasticizer for said vinyl resin
   3. a blowing agent which decomposes when heated at a temperature within the range of above the glass transition temperature of the plasticized vinyl resin and below the decomposition temperature of said resin; and
   4. an amine-formaldehyde derivative that will undergo condensation-polymerization under acidic conditions;

forming said blend into a sheet and applying to said sheet, in a predetermined pattern, a catalyst capable of initiating said condensation-polymerization under ambient or subsequently applied elevated temperature, and thereafter heating the resultant sheet to fuse the plasticized resin and decompose the blowing agent, to thereby form foamed and unfoamed areas corresponding to the predetermined pattern of catalyst application.

2. The process of claim 1 wherein said vinyl resin is polyvinyl chloride.

3. The process of claim 1 wherein said catalyst is present as a composition containing a liquid capable of penetrating said thermoplastic sheet sufficiently to contact said derivatives.

4. The process of claim 3 wherein said liquid capable of penetrating said thermoplastic sheet is a plasticizer therefor.

5. The process of claim 3 wherein said liquid capable of penetrating said thermoplastic sheet is a solvent therefor.

6. The process of claim 1 wherein said catalyst is selected from
   a. a strong acid
   b. a compound that will generate a strong acid upon reaction with hydroxylic or amino group; and
   c. a compound that will generate a strong acid upon heating to an elevated temperature below the decomposition temperature of the vinyl resin.

7. The process of claim 1 wherein said amine-formaldehyde derivative is characterized by the presence of at least two groups selected from N-hydroxymethyl and N-alkoxymethyl and mixtures thereof.

8. The process of claim 7 wherein said amine-formaldehyde derivative comprises hexakis(methoxymethyl)melamine.

9. The process of claim 7 wherein said vinyl resin is polyvinyl chloride.

10. The process of claim 7 wherein said catalyst is present as a composition containing a liquid capable of penetrating said thermoplastic sheet sufficiently to contact said derivatives.

11. The process of claim 7 wherein said catalyst is selected from
   a. a strong acid
   b. a compound that will generate a strong acid upon reaction with hydroxylic or amino group; and
   c. a compound that will generate a strong acid upon heating to an elevated temperature below the decomposition temperature of the vinyl resin.

12. The process of claim 1 wherein said process additionally comprises blending
   5. a component containing a plurality of reactive groups capable of undergoing condensation polymerization with said amine-formaldehyde derivative of (4) under acidic conditions.

13. The process of claim 12 wherein said vinyl resin is polyvinyl chloride.

14. The process of claim 12 wherein said catalyst is present as a composition containing a liquid capable of penetrating said thermoplastic sheet sufficiently to contact said derivatives.

15. The process of claim 12 wherein said catalyst is selected from
   a. a strong acid
   b. a compound that will generate a strong acid upon reaction with hydroxylic or amino group; and
   c. a compound that will generate a strong acid upon heating to an elevated temperature below the decomposition temperature of the vinyl resin.

16. The process of claim 12 wherein said amine-formaldehyde derivative is characterized by the presence of at least two groups selected from N-hydroxymethyl and N-alkoxymethyl and mixtures thereof.

17. The process of claim 16 wherein said amine-formaldehyde derivative comprises hexakis(methoxymethyl)melamine.

18. The process of claim 16 wherein said vinyl resin is polyvinyl chloride.

19. The process of claim 16 wherein said catalyst is present as a composition containing a liquid capable of penetrating said thermoplastic sheet sufficiently to contact said derivatives.

20. The process of claim 16 wherein said catalyst is selected from
   a. a strong acid
   b. a compound that will generate a strong acid upon reaction with hydroxylic or amino group; and
   c. a compound that will generate a strong acid upon heating to an elevated temperature below the decomposition temperature of the vinyl resin.

21. A process for providing an embossed appearance to a thermoplastic sheet which comprises forming a blend consisting essentially of:
   1. a vinyl resin,
   2. a plasticizer for said vinyl resin in an amount of from 20 to 130 percent by weight based on the weight of the resin,
   3. a blowing agent which decomposes when heated at a temperature within the range of above the glass transition temperature of the plasticized resin and below the decomposition temperature of said resin, said blowing agent being present in an amount of from 0.5 to 15 percent by weight based on the weight of the resin; and
   4. an amine-formaldehyde derivative that will undergo condensation polymerization under acidic conditions, in an amount of from 2 to 30 percent by weight based on the total weight of the blend; forming said blend into a sheet and applying to said sheet, in a predetermined pattern, a catalyst capable of initiating said condensation-polymerization under ambient or subsequently applied elevated temperature, and thereafter heating the resultant sheet to fuse the plasticized resin and decompose the blowing agent, to thereby form foamed and unfoamed areas corresponding to the predetermined pattern of catalyst application.

22. The process of claim 21 wherein said vinyl resin is polyvinyl chloride.

23. The process of claim 21 wherein said catalyst is present as a composition containing a liquid capable of penetrating said thermoplastic sheet sufficiently to contact said derivatives.

24. The process of claim 23 wherein said liquid capable of penetrating said thermoplastic sheet is a plasticizer therefor.

25. The process of claim 23 wherein said liquid capable of penetrating said thermoplastic sheet is a solvent therefor.

26. The process of claim 21 wherein said catalyst is selected from
   a. a strong acid
   b. a compound that will generate a strong acid upon reaction with hydroxylic or amino group; and
   c. a compound that will generate a strong acid upon heating to an elevated temperature below the decomposition temperature of the vinyl resin.

27. The process of claim 21 wherein said amine-formaldehyde derivative is characterized by the presence of at least two groups selected from N-hydroxymethyl and N-alkoxymethyl and mixtures thereof.

28. The process of claim 27 wherein said amine-formaldehyde derivative comprises hexakis(methoxymethyl)melamine.

29. The process of claim 27 wherein said vinyl resin is polyvinyl chloride.

30. The process of claim 27 wherein said catalyst is present as a composition containing a liquid capable of penetrating said thermoplastic sheet sufficiently to contact said derivatives.

31. The process of claim 27 wherein said catalyst is selected from
   a. a strong acid
   b. a compound that will generate a strong acid upon reaction with hydroxylic or amino group; and
   c. a compound that will generate a strong acid upon heating to an elevated temperature below the decomposition temperature of the vinyl resin.

32. The process of claim 21 wherein said process additionally comprises blending additional components (5) containing a plurality of reactive groups capable of undergoing condensation polymerization with said amine-formaldehyde derivatives of (4) under acidic conditions, in an amount up to 60 percent by weight based on the total weight of the thermoplastic blend.

33. The process of claim 32 wherein said vinyl resin is polyvinyl chloride.

34. The process of claim 32 wherein said catalyst is present as a composition containing a liquid capable of penetrating said thermoplastic sheet sufficiently to contact said derivatives.

35. The process of claim 32 wherein said catalyst is selected from
   a. a strong acid
   b. a compound that will generate a strong acid upon reaction with hydroxylic or amino group; and
   c. a compound that will generate a strong acid upon heating to an elevated temperature below the decomposition temperature of the vinyl resin.

36. The process of claim 32 wherein said amine-formaldehyde derivative is characterized by the presence of at least two groups selected from N-hydroxymethyl and N-alkoxymethyl and mixtures thereof.

37. The process of claim 36 wherein said amine-formaldehyde derivative comprises hexakis(methoxymethyl)melamine.

38. The process of claim 36 wherein said vinyl resin is polyvinyl chloride.

39. The process of claim 36 wherein said catalyst is present as a composition containing a liquid capable of penetrating said thermoplastic sheet sufficiently to contact said derivatives.

40. The process of claim 36 wherein said catalyst is selected from
   a. a strong acid
   b. a compound that will generate a strong acid upon reaction with hydroxylic or amino group; and
   c. a compound that will generate a strong acid upon heating to an elevated temperature below the decomposition temperature of the vinyl resin.

* * * * *